Figure 1:
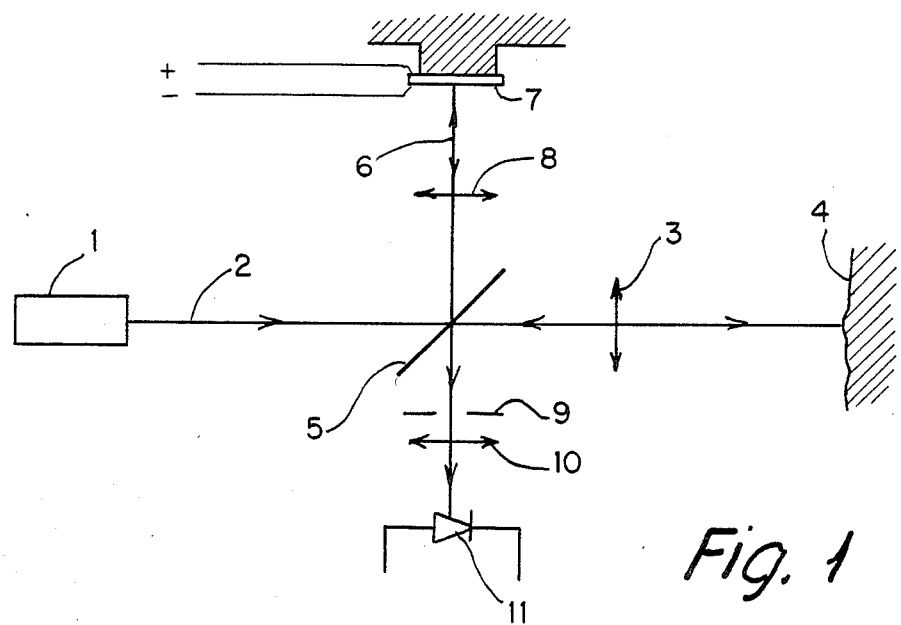

United States Patent [19]

Bager

[11] Patent Number: 4,796,994
[45] Date of Patent: Jan. 10, 1989

[54] METHOD AND APPARATUS FOR MEASURING VARIATIONS IN DISTANCES

[76] Inventor: Lars Bager, 54, Vester Faelledvej, DK-1750 Kobenhavn V, Denmark

[21] Appl. No.: 893,474

[22] Filed: Aug. 5, 1986

[30] Foreign Application Priority Data

Aug. 13, 1985 [DK] Denmark .................. 3665/85

[51] Int. Cl.$^4$ .......................................... G01B 9/02
[52] U.S. Cl. ............................................. 356/358
[58] Field of Search ............... 356/351, 358, 359, 360

[56] References Cited

FOREIGN PATENT DOCUMENTS 2075180A 5/1980 United Kingdom .

OTHER PUBLICATIONS

Bruning et al., "Digital Wavefront Measuring Interferometer for Testing Optical Surfaces and Lenses", *Applied Optics*, vol. 13, No. 11, pp. 2693–2703, 11/74.

*Primary Examiner*—Davis L. Willis
*Assistant Examiner*—Matthew W. Koren
*Attorney, Agent, or Firm*—Armstrong, Nikaido, Marmelstein & Kubovcik

[57] ABSTRACT

Method and apparatus for measuring variations in the distance between a point of reference and the surface of an object. In the method light emitted from a substantially monochromatic light source is reflected from the surface of the body and in an interferometer is combined with a reference beam with a known path and from the same light source and by means of a light sensitive device is converted into an electric signal. The electric signal is converted into an output signal in a digitized signal processing device comprising for a continuous processing component of the first derivative of the curve of the electric signal, which output signal is an expression for the variation in distance being measured. In order in a simple way to determine the sign or polarity of variation of the distance without reducing the wide field of measurement obtained by the method, the length of the path of the reference beam is substantially momentarily changed with a value corresponding to ¼ wavelength of the emitted light. The digitized signal processing device is adapted to establish whether a change in sign takes place with respect to a mean value for said signal, the same or the opposite sign being applied to the registered variation of the distance if the electrical signal is positive or negative after the momentary change, providing the momentary change is an increase of the length of the path and the opposite application of the sign, if the change is a decrease of the length of the path of the reference beam.

7 Claims, 3 Drawing Sheets cos(S(t))

Arccos cos(S(t))

S(t)

METHOD AND APPARATUS FOR MEASURING VARIATIONS IN DISTANCES

The present invention relates to a method for measuring variations in the distance between a point of reference and the surface of an object, in which method light emitted from a substantially monochromatic light source is reflected from the surface of the body and in an interferometer is combined with a reference beam with a known path and from the same light source and by means of light sensitive means is converted into an electric signal, which is converted into an output signal in digitized signal processing means comprising means for a continuous processing of the first derivative of the curve of the electric signal, which output signal is an expression for the said variation in distance. The invention further relates to an apparatus for performing the method.

In the known method the electric signal produced by the light-sensitive means may be expressed by the formula:

$$U = A + B \cos 4\pi/\lambda(L + S(t)),$$

in which A and B are constants and L is the difference in optical distance between the path of the emitted light and of the reference beam, S(t) expressing the variation in said distance expressed as a function of time. From the formula it is seen that a movement of the object results in a definite variation of U, which by means of the digitalized processing means with certain reservations is a measure of the extent of the movement. A substantial problem is, however, that $$\cos(S(t)) = \cos(-S(t))$$

which means that the voltage of the signal gives no information on the sign of the variation. In a method disclosed by G. Lauer, Absolute Kalibrierung von Beschleunigungs-aufnehmer-Vergleichsnormalen, Fortschritt der Akustik DAGA '80, München, s. 811–814, VDE-Verlag GmbH, Berlin 1980, it is suggested to produce two with respect to each other polarized and by 90° displaced measuring beams, which are superimposed with the reference beam and separated spatially by means of a Wollaston prism in order to produce two electrical signals, of which one as hitherto is an expression of cos(S(t)), while the other expresses sin(S(t)). The digitized processing of the two signals may then be made in such a way that the variation in distance may be fully calculated both with respect to its size and its direction of movement, as S(t) is proportional to arctan to the quotient between the two signals. A drawback of this method is that the interferometer to be used is rather complex and contains a number of expensive components. A further drawback is that errors of measurements will occur if the surface of the object reflects the two polarizations of the beam differently. This normally implies that a mirror is secured to the surface, to which the distance is measured, and, consequently, the known method is not suited for non-destructive measurements. Similar constructions are disclosed in GB-PS No. 2,136,117 and US-PS No. 4,480,914.

In another known method the sign of the measurements is determined by means of a modulation of the light in the reference beam. This method, however, has a restricted measuring field restricted by the modulation frequency. In order to obtain a wide field a high modulation frequency has to be used, but in practice difficulties occur if sufficiently high frequencies are used owing to heat dissipation in the components used for providing the modulation.

The object of the invention is to provide a method for determination of the direction of the distance variation without need for polarizing or modulation of the light frequency and without complicated steps that imply a limitation of the field of measurement apart from the inherent limitations from the measurement based on light interference.

According to the invention this object is achieved through a substantially momentary change of the length of the path of the reference beam with a value corresponding to 1/4 wave-length of the emitted light, the digitized signal processing means being adapted to establish whether a change in sign takes place with respect to a mean value for said signal, the same or the opposite sign being applied to the registered variation of the distance if the electrical signal is positive or negative after the momentary change, providing the momentary change is an increase of the length of the path and the opposite application of the sign, if the change is a decrease of the length of the path of the reference beam.

Through the momentary change in the length of the path of the reference beam a change of phase is obtained, the interference signal now being:

$$\cos(S(t) - \pi/2) = \sin(S(t))$$

As the change is substantially momentary, two substantially corresponding values of the angular function are obtained and a basis for determination of the sign of the variation in distance, by which variation the interference signal is produced. The term substantially momentary is to be interpreted in relation to the sampling frequency for the digitized signal processing means, the two signals being separated by a number of clockpulses in the signal conversion means corresponding to the reaction time obtainable in practice for the means for changing the path. However, no calculations are based on the sinus value in the signal processing and, therefore, the requirement to simultaneity of the two registrations is just so strict that a change in sign may be established.

The method according to the invention provides an extremely simple way to establish the sign and is useful in connection with different types of interferometers. The method increases the versatility of the measuring method and makes it useful for example for hand-held instruments for measuring surface roughness or vibrations, measuring devices including real-time measuring devices for registration of deformations in load-carrying structures, for example bridges, houses or engines.

According to a preferred embodiment of the method the time periods, in which the variation of the distance is slow, are established, and in time periods, in which the varation in the distance is small, the change in the path is performed. Thereby, the method is less sensitive to the fact that the cosinus and sinus values are not simultaneous, but are separated by the reaction time for the electrical and mechanical components.

The invention further relates to an apparatus for measuring variations of the distance between a point of reference and the surface of a body performing the method according to claim 1. The apparatus comprises a substantially monochronous light source adapted to direct a thin beam of light towards the body and comprising means for branching a divisional beam on a path comprising at least one reflection from a reflecting surface, means for receiving light that is reflected from the object surface and for combining this light with light from the reference beam on photosensitive means, adapted to provide an electrical signal dependant on the light intensity, and digital signal processing means comprising means for registration of the actual inclination of the curve of the electrical signal and for converting the signal into an output expressing said variation of the distance.

The apparatus according to the invention is characterized in that the reflecting surface is provided on means being able to perform a substantially momentary displacement amounting to ½ wavelength of the emitted light, and that the digital signal processing means are able simultaneously to establish a possible change in the sign of the signal from the photo-sensitive means, and to assign the registered variation the same or the opposite sign as the inclination of the signal curve, if the electrical signal is positive or negative after the displacement, if the displacement increases the path or, oppositely, if the displacement shortens the path of the reference beam.

The apparatus, which may be constructed as a conventional Michelson-interferometer, comprises few components, but is able to perform measurements with great accuracy within a wide measuring field comprising even high speed rates. This is especially due to the fact that the signal conversion comprises few and simple functions and to the fact that the sampling and signal processing may be performed within a single clock-pulse on a microprocessor or corresponding processing equipment. The upper limit for the rate of variation in the measured distance is determined by the wavelength of the light and of the clock frequency and the condition that variation of the argument of the cosinus function is not to exceed $\pi$ between two samplings following each other. This speed is greater than the speed for apparatuses based on modulation of the light in the reference beam.

In accordance with a preferred embodiment of the apparatus according to the invention the displacable means a surface on a piezoelectrical crystal, which is connected with a controlable D/C source. If the voltage is changed momentarily a deformation of the crystal will change its dimensions in accordance with the change in the voltage, the crystal and the change in voltage being such that the displacement of the reflecting surface is exactly ⅛ wavelength, whereby the length of the path for the reference beam is changed by ¼ wavelength.

In this connection it should be mentioned that it is known in a Michelson inteferometer to place one of the reflecting surfaces for the reference beam on a piezoelectric crystal, cf. for example U.S. Pat. specification No. 4,171,159. In the disclosed apparatus the piezoelectrical crystal is controlled by an A/C with square form, in order to obtain a number of measurements corresponding to cos (S(t)) and sin(S(t)), the object to be examined being oscillated with a known, relatively low frequency. The general purpose of of the known apparatus differs from the purpose of the apparatus according to the invention.

Figure 6:
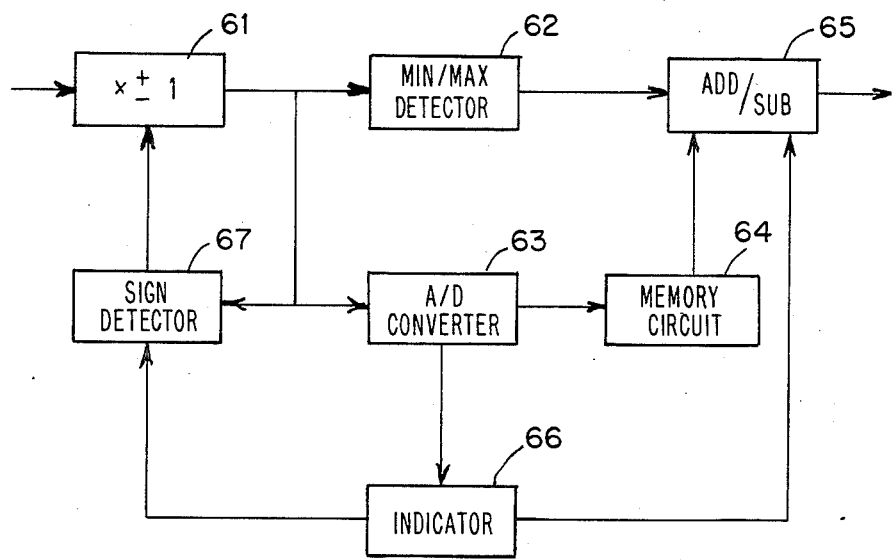
Figure 2:
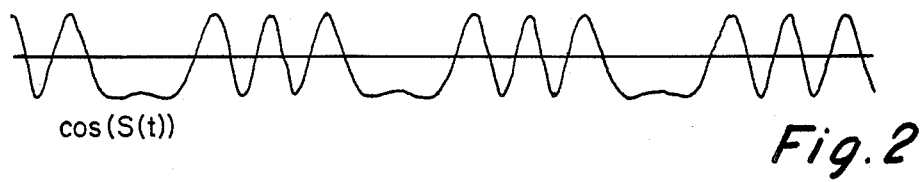
Figure 3:
Figure 4:
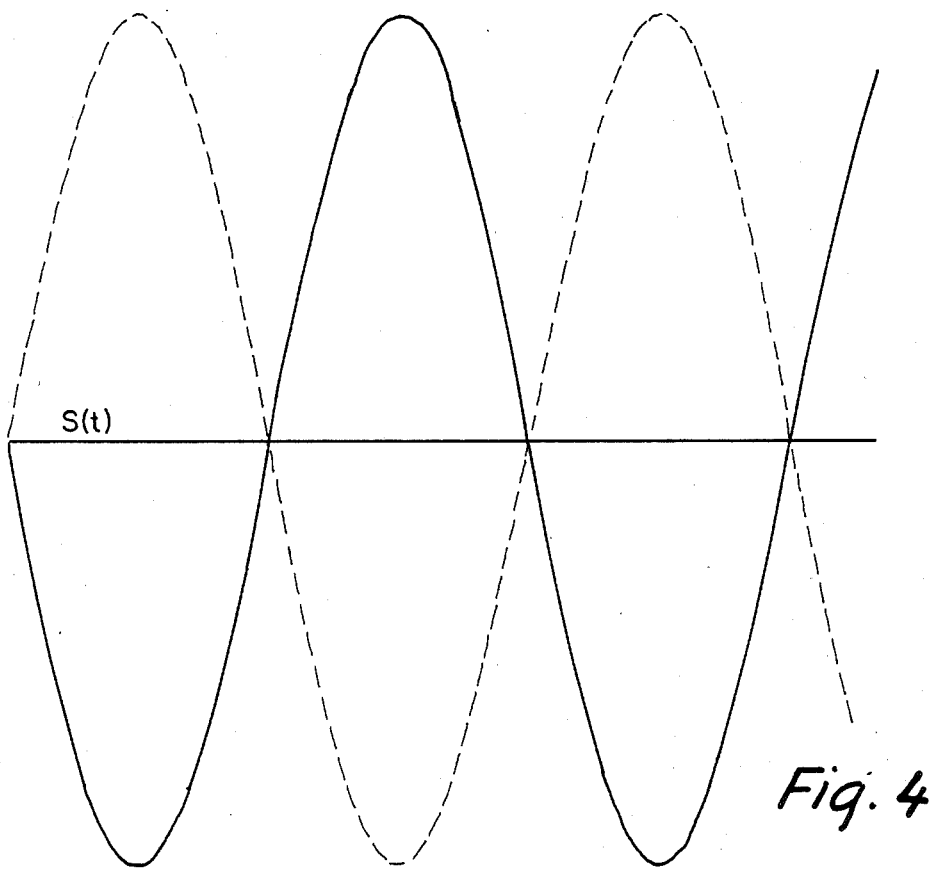

The invention is described in details in the following with reference to the drawing, in which:

FIG. 1 shows a diagram for a Michelson interferometer to be used in an apparatus according to the invention, FIG. 2 shows a curve for an electric signal from the photosensitive means, FIG. 3 shows a curve for arccos to the curve according to FIG. 2, FIG. 4 shows a curve showing the variation in distance based on the curve according to FIG. 3, FIG. 5a, 5b, and 5c show curves demonstrating the influence on the electric signal, if the length of the path of the reference beam is changed and further show the corresponding voltage to the piezoelectrical crystal, FIG. 6 shows a block diagram for an embodiment of the signal conversion means in an apparatus according to the invention.

The method according to the invention is based on the use of an interferometer which from a light source emits a thin beam of light towards the body, the surface of which is to be examined, and a reference beam, the path of which to a photosensitive means is known. Light being reflected from the surface of the object is brought to interfere with the light from the reference beam, and the interference signal is registered by means of the photosensitive means. An embodiment of an interferometer of this type is shown diagrammatically in FIG. 1. The interferometer comprises a light source 1, which may for example be a semiconductor laser. From the light source 1 a thin beam 2 of light is emitted, which beam through a lens 3 is directed against the surface of the object 4, the variation in distance to which is to be examined. The light beam is focused on the surface of the object by means of the lens 3. On its path between the laser and the lens, the beam passes a so-called beam-splitter 5 constructed as a partly transparent mirror, forming an angle of 45° with the light beam. Thereby a reference beam 6 is split from the light beam under an angle of 90°, which reference beam 6 is reflected from a reflecting surface 7 along the same path, but in the opposite direction. In the path a lens 8 may be present for focusing the reference beam. The reflected beam hits the beam-splitter. 5,, passes an aperture in a diaphragm 9, a lens 10 and is focused on the surface of a photosensitive means 11, for example a photodiode. Part of the light hitting the object 4 is reflected through the lens 3 and reaches the beam-splitter 5, reflecting part of the reflected light through the aperture 9 and the lens 10 to the photosensitive means 11. An interference will occur between the light in the reference beam and the light reflected from the object 4, which is sensed by the photosensitive means. If, for example, the object is moving with a harmonic vibration S(t), the output from the photosensitive means will have a form like the one shown in FIG. 2. The curve is the function cos(S(t)), and from this curve the movement of the object may be converted by means of a traditional, digital processing and computing to the curve shown in FIG. 3, corresponding to arccos(S(t)), and from this curve the movement of the object S(t) may be deduced as shown in FIG. 4. The apparatus described, however, will not be able to determine whether the curve of S(t) is the one in full lines or the one shown in broken lines, which can be explained by the fact that $$\cos(S(t)) = \cos(-S(r))$$

From the output from the photosensitive means 11 it cannot be determined if the curve is the one shown in FIG. 2 or the curve inverted with respect to the axis of abscissa.

By means of the method according to the invention it is possible to determine if the curve is the one shown in the figure or the inverted curve. In accordance with the method according to the invention the length of the path of the reference beam is changed momentarily with an amount corresponding to $\frac{1}{8}$ wavelength of the light emitted from the light source. As the output U from the photosensitive means may be expressed as $$U A + B \cos (4\pi/\lambda(L+S(t)),$$

in which A and B are constants and L is the difference in length between the paths of the emitted light and the reference beams, and $$\cos(v - \pi/2) = \sin v,$$

the output U after the change of the length of the path of the reference beam corresponds to:

$$U = A + B \sin (4\pi/\lambda(L+S(t))).$$

Figure 5A:
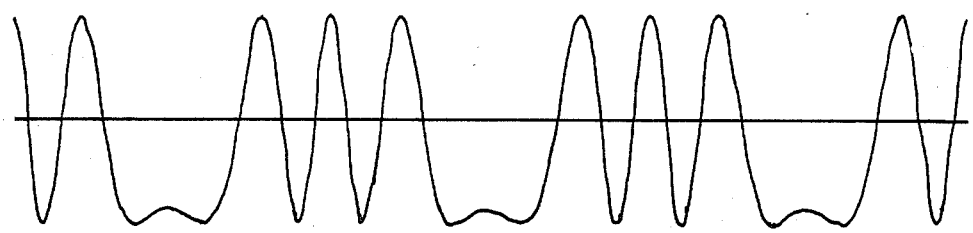
Figure 5B:
Figure 5B:
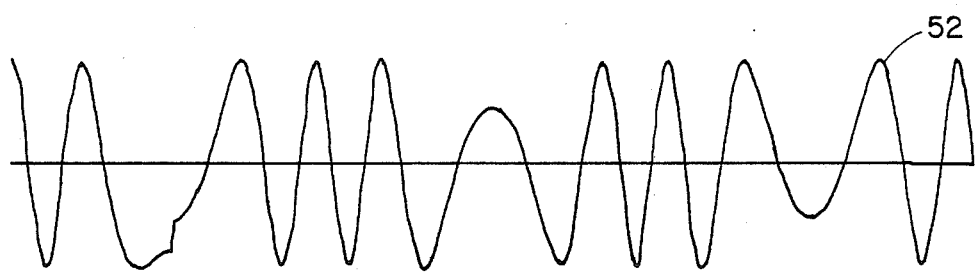
Figure 5C:
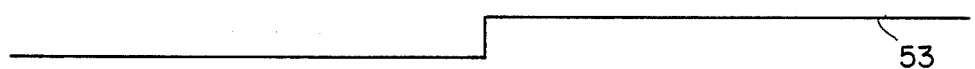
Figure 5C:
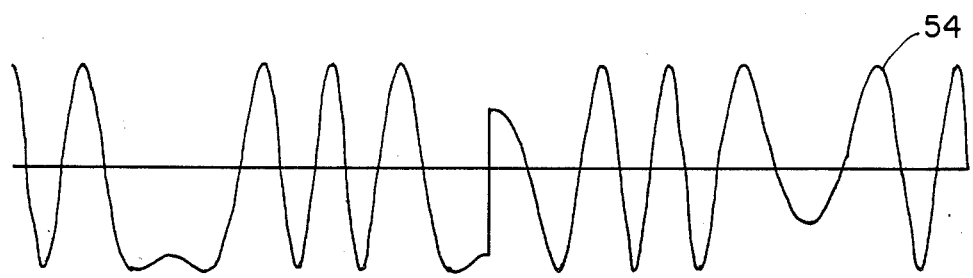

In FIGS. 5a, 5b, and 5c examples of the curves from the output from the photosensitive means are shown. FIG. 5a shows the curve corresponding to an output from a harmonic swinging of the object. In FIG. 5b two curves are shown, firstly the curve 51 representing the length of the path of the reference beam, secondly the curve 52 representing the output from the photosensitive means. Simultaneously with the change in the length of the path a change will occur in the output. This change corresponds to a phase displacement of $\pi/2$ of the signal and thereby the signal is substantially proportional with $\sin(S(t))$ at that particular moment. In FIG. 5c the change of the length of the path is made at another point (as FIG. 5a is identical with FIG. 2 the point corresponds to the other extreme position of the swinging motion), and on the curve 54 corresponding to the output from the photosensitive means a change is seen at the change of the length of path for the reference beam. In the latter case the output changes its sign. According to the invention these facts are used for determining the direction of the movement of the object, or in other words to determine the sign of the actual variation in distance to be measured. In order to determine this sign in general it is necessary to perform running registrations of the inclination of the curve of the output from the photosensitive means, the registered variation in the distance being assigned the same or the opposite sign if the output signal is the same or the opposite, respectively, after the change, if this corresponds to an increase in the length of the path and the opposite assignment of signs, if the change corresponds to a decrease in the length of the path.

On the apparatus shown in FIG. 1 the displacement of the path is performed by mounting the mirror 7 on a piezoelectrical crystal 12, or by polishing the surface of one of the electrodes and possibly furnishing it with a reflecting covering. By means of a change in the voltage over the crystal the crystal will change its shape and by means of a suitable choice of the dimensions of the crystal and the change in voltage, the reflecting surface may be displaced exactly $\frac{1}{8}$ wavelength in order to increase or shorten the path of the reference beam with $\frac{1}{4}$ wavelength.

The processing and conversion of the output may be performed in processing means corresponding to the diagram in FIG. 6. The conversion and processing means shown are in general based on traditional techniques and the diagram is merely an illustration of how the change in the sign of the electrical signal from the photosensitive means may be used for determining the sign of the resulting signal. The analogous output signal from the photosensitive means is used as input for a converter 61 which depending on a control signal may change the polarity of the input signal or transmit it unchanged. The corrected input is transferred to an analogous minimum/maximum detector 62 and to an analogical/digital converter 63. The digitized output is fed to a memory circuit 64, which for each signal from the a/d converter 63 provides an output corresponding to arccos of the input. This signal is directed to an addition/subtraction circuit, in which the signal is added or subtracted from a current sum depending on a control signal received from the min./max. detector 62. This detector "senses" the analog input and provides an output which depends on the sign of the inclination of curve of the input. This sign determines if the elementary samples, which via the memory circuit 64 are directed to the circuit 65, are to be added or subtracted from the sum. According to the invention the digitzed signal is directed also to an indicator 66, which activates the change in the path of the reference beam and simultaneously directs a signal to a sign-detector 67, to which also the analogous input from the photosensitive means is fed. According to the registration of whether a change in sign has taken place or not, a signal is directed to the converter 61 to change or retain the polarity of the signal depending on whether the activated change was an increase or a decrease of the length of the path of the reference beam. Another purpose of the indicator 66 is to determine suitable points to activate the change in the length of the path. The most suitable points are when the variations in the digital signals are small. These points correspond to a small variation in the distance between the object and the interferometer. The indicator 66 may in principle be constructed as a digital comparator, in which the actual value of a signal is compared with one or more previous values, and which activates or enables activation of the change in the length of the path. By means of this selection of the point for the change the requirements for the actual performance of the means for moving the mirror are reduced, as this movement only need to be momentarily compared with the actual movement of the object, i.e. the change in S(t).

It should be noticed that the above signal processing circuit allows the use of a high sampling frequence which may for example correspond to the clock-frequency of the microprocessor to be used. The other components will be able to use the same frequency and do not reduce the sampling frequency. A high sampling frequency is advantageous for the apparatus comprising interferometer and signal conversion circuits, as the maximum rate, at which the distance may vary, is proportional to the sampling frequency. Owing to the change in the length of the path a phase displacement for the analogous input will occur, but this error is without influence in practice on the exactness of the measurements. It is possible to suspend the signal processing during the movement of the mirror for a number of clock periods corresponding to the time used for the displacement of the mirror, and this will not introduce any significant uncertainty in the determination of whether a change in the polarity of the electric output signal has taken place, providing the displacement is performed in a period, in which the movement of the object is slow.

We claim:

1. Method for measuring variations in the distance between a point of reference and a surface of an object, said method comprising:

directing a beam emitted from a substantially monochromatic light source onto said surface of said body;

combining in an interferometer light reflected from said surface of said object with a reference beam having a known path and from the same light source to give a combined beam;

converting said combined beam into an electric signal by means of light sensitive means;

effecting a substantially momentary change of the length of the path of said reference beam with a value corresponding to ¼ wave-length of said emitted beam from said monochromatic light source;

converting said electric signal into an output signal in digitized signal processing means for establishing whether a change in sign takes place with respect to a mean value of said electric signal, the same or the opposite sign being applied to the registered variation of the signal if the electrical signal is positive or negative after said momentary change, providing said momentary change is an increase of the length of the path and the opposite application of the sign, if the change is a decrease of the length of the path of said reference beam, said digitized signal processing means comprising means for effecting a continuous processing of the first derivative of the curve of the electric signal, said output signal being an expression for the said variation in distance.

2. Method according to claim 1, wherein time periods in which the variation of the distance is small are established, said change of the length of the path being performed within said time periods.

3. Method according to claim 1, wherein said converting of said electric signal in said signal processing means is unchanged after said momentary change in the optical length of the path of the reference beam.

4. Method according to claim 1, wherein said signal processing comprises deriving an arccos value corresponding to the actual signal from said light sensitive means.

5. Apparatus for measuring variations of the distance between a point of reference and a surface of an object in accordance with the method claimed in claim 1, said apparatus comprising:

a substantially monochromatic light source for directing a thin beam of light towards a surface of an object;

means for branching a divisional beam on a path comprising at least one reflection from a reflecting surface to generate a reference beam;

means for receiving reflected light reflected from said object surface and for combining said reflected light with light from said reference beam on photosensitive means for providing an electrical signal dependent on the light intensity;

displaceable means on which said reflecting surface is provided for performing a substantially momentary displacement amounting to ½ wave-length of the light emitted from said monochromatic light source;

digital signal processing means for simultaneously establishing a possible change in the sign of the signal from said photosensitive means and assigning the registered variation the same or the opposite sign as the inclination of the signal curve, if the electrical signal is positive or negative after the displacement, if the displacement increases the path or, oppositely, if the displacement shortens the path of the reference beam, said digital signal processing means comprising means for monitoring the actual inclination of the curve of said electrical signal and for converting said signal into an output expressing said variation of the distance.

6. Apparatus according to claim 5, wherein said displaceable means is a surface on a piezoelectrical crystal connected with a controllable D/C source.

7. Apparatus according to claim 6, wherein said signal processing means comprises a digital comparator for registering the difference between sample values following each other or corresponding digitized values, and for initiating the change of the D/C output to the piezoelectrical crystal at registration of a low value of the difference.

* * * * *